US 11,645,705 B2

(12) United States Patent
Shoen et al.

(10) Patent No.: US 11,645,705 B2
(45) Date of Patent: May 9, 2023

(54) METHOD AND APPARATUS FOR REAL-TIME QUALIFICATION OF RENTAL CUSTOMERS

(71) Applicants: Edward J Shoen, Phoenix, AZ (US); Michael George Colman, Glendale, AZ (US); Mariah Anne Reid, Phoenix, AZ (US); Arthur Scott Tonan, Phoenix, AZ (US); John Samuel Wathen, Phoenix, AZ (US)

(72) Inventors: Edward J Shoen, Phoenix, AZ (US); Michael George Colman, Glendale, AZ (US); Mariah Anne Reid, Phoenix, AZ (US); Arthur Scott Tonan, Phoenix, AZ (US); John Samuel Wathen, Phoenix, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 419 days.

(21) Appl. No.: 14/341,610

(22) Filed: Jul. 25, 2014

(65) Prior Publication Data
US 2015/0032487 A1    Jan. 29, 2015

Related U.S. Application Data

(60) Provisional application No. 61/859,151, filed on Jul. 26, 2013.

(51) Int. Cl.
G06Q 10/02        (2012.01)
G06Q 30/0645    (2023.01)
G09B 23/28        (2006.01)

(52) U.S. Cl.
CPC ......... G06Q 30/0645 (2013.01); G06Q 10/02 (2013.01); G09B 23/28 (2013.01)

(58) Field of Classification Search
CPC ..... G06F 21/32; G06Q 30/0645; G06Q 10/02
(Continued)

(56) References Cited

U.S. PATENT DOCUMENTS 7,991,388 B1 *  8/2011  Becker ................... G06Q 20/32
                                                              455/410
8,577,810 B1 * 11/2013  Dalit ...................... G06Q 20/20
                                                              705/16

(Continued)

FOREIGN PATENT DOCUMENTS

WO    WO2013137181    9/2013
WO    WO2014152916    9/2014

OTHER PUBLICATIONS

Luo et al.; An Anonymous Car Rental System Based on NFC; 2013 International Symposium on Biometrics and Security Technologies; IEEE Computer Society; pp. 97-104.

Primary Examiner — Shannon S Campbell
Assistant Examiner — Freda A Nelson
(74) Attorney, Agent, or Firm — Richard E. Oney; Venjuris, P C.

(57) ABSTRACT

A method and system for real-time qualification of rental customers allows a rental company to quickly qualify a customer making an online reservation of a rental vehicle, such as a car share rental, without requiring the customer to be a member or have a membership or to be pre-qualified. The system includes: a database operative to store account information associated with a customer for a rental transaction; an input component operative to receive from the customer an uploaded image of the customer's driver's license and an uploaded second image of the customer; and a processor operative with the database to use the uploaded driver's license image, the uploaded second image and information associated with the uploaded second image to qualify the customer for a rental transaction. The system can (Continued)

compare the customer's driver's license image to the uploaded second image of the customer and qualify the customer for the rental transaction if the second image is uploaded within a pre-defined time before the rental time period begins. The information associated with the second uploaded image of the customer can include a timestamp associated with the second uploaded image and/or a GPS location associated with the uploaded image.

24 Claims, 21 Drawing Sheets

(58) Field of Classification Search
USPC .................. 382/115; 705/317, 5; 434/258
See application file for complete search history.

(56) References Cited

U.S. PATENT DOCUMENTS

| | | | | |
|---|---|---|---|---|
| 8,598,977 B2* | 12/2013 | Maalouf | ............... | G06Q 30/02 |
| | | | | 382/104 |
| 10,579,780 B1 | 3/2020 | Carlos et al. | | |
| 2002/0186144 A1 | 12/2002 | Meunier | | |
| 2008/0067242 A1* | 3/2008 | Bonalle | ............... | G07F 7/1008 |
| | | | | 235/380 |
| 2009/0187417 A1* | 7/2009 | Lidestri | ............... | G06Q 10/10 |
| | | | | 705/317 |
| 2009/0321517 A1* | 12/2009 | Deane | ............... | G07C 9/00007 |
| | | | | 235/382 |
| 2010/0106608 A1* | 4/2010 | Menendez | ............ | G06F 17/243 |
| | | | | 705/17 |
| 2010/0228405 A1* | 9/2010 | Morgal | ............... | B60L 50/20 |
| | | | | 701/1 |
| 2010/0280700 A1 | 11/2010 | Morgal et al. | | |
| 2011/0040692 A1 | 2/2011 | Ahroon | | |
| 2011/0058048 A1 | 3/2011 | Elazar et al. | | |
| 2011/0112969 A1 | 5/2011 | Zaid et al. | | |
| 2011/0173041 A1 | 7/2011 | Breitenbach et al. | | |
| 2011/0276484 A1 | 11/2011 | Pearson et al. | | |
| 2011/0288891 A1 | 11/2011 | Zaid et al. | | |
| 2011/0307375 A1 | 12/2011 | Maney | | |
| 2011/0313937 A1 | 12/2011 | Moore, Jr. et al. | | |
| 2012/0070029 A1* | 3/2012 | Muriello | ............... | G06F 21/44 |
| | | | | 382/100 |
| 2012/0105197 A1 | 5/2012 | Kobres | | |
| 2012/0114196 A1* | 5/2012 | Lee | ............... | G06V 40/16 |
| | | | | 382/118 |
| 2012/0200390 A1 | 8/2012 | Saravanan | | |
| 2012/0323930 A1* | 12/2012 | Kennberg | ............ | H04L 63/101 |
| | | | | 707/748 |
| 2013/0011820 A1* | 1/2013 | Yancosek | ............... | G09B 23/28 |
| | | | | 434/258 |
| 2013/0073349 A1 | 3/2013 | Kolling | | |
| 2013/0104080 A1* | 4/2013 | Bosworth | ............ | G06F 16/951 |
| | | | | 715/838 |
| 2013/0221101 A1 | 8/2013 | Lebaschi et al. | | |
| 2013/0222616 A1 | 8/2013 | Mendis | | |
| 2013/0317693 A1* | 11/2013 | Jefferies | ............... | B60R 25/24 |
| | | | | 701/31.5 |
| 2013/0325521 A1 | 12/2013 | Jameel et al. | | |
| 2014/0037155 A1* | 2/2014 | Faria | ............... | G07C 9/37 |
| | | | | 382/118 |
| 2014/0129053 A1* | 5/2014 | Kleve | ............... | G07F 17/0057 |
| | | | | 701/2 |
| 2014/0242971 A1* | 8/2014 | Aladenize | ............... | H04W 4/80 |
| | | | | 455/418 |
| 2015/0019300 A1 | 1/2015 | Vakili | | |
| 2016/0275760 A1* | 9/2016 | Block | ............... | G06Q 20/3223 |
| 2017/0039489 A1* | 2/2017 | Reh | ............... | G06Q 30/016 |
| 2019/0095877 A1 | 3/2019 | Li | | |

\* cited by examiner

← → ⊙ ⊕ http://beta.uhaulcarshare.com  🔎 ▼ 🏛 Certificate mirror ☐ ✱ ✕ | ⊕ U-Haul Care Share | ⊕ Amerco Intranet: Home | ⊕ Create Account - U-...

100

Please take a picture of your driver's license and upload it for account driver verification C:\Users\1043638\Picture [Browse...] ⎯⎯ 112

Account Login Information ⎫
Email address               Confirm email address  ⎪
[ssample_05@hotmail.com]   [ssample_05@hotmail.com] ⎬ 106
Password         🔒         Confirm Password       ⎪
[●●●●●]                     [●●●●●]                 ⎭

Payment Method                                   ⎫
Card number                                          ⎪
[4445222299990007]                                   ⎪
Exp. month         Exp. year      Card security code ⎬ 108
[12 - December ▼] [2014 ▼]       [222 ▼]             ⎪
Cardholder name                                      ⎪
[Samantha Sample]                                    ⎭

Billing address for payment method               ⎫
Address                                              ⎪
[1601 W Jefferson St]                                ⎪
Address 2                                            ⎪
[1601 W Jefferson St]                                ⎬ 110
City               State          Zip                ⎪
[Phoenix]         [Arizona ▼]    [85007]             ⎭

[Create Account]   Cancel ⎯⎯ 114

FIG. 2B

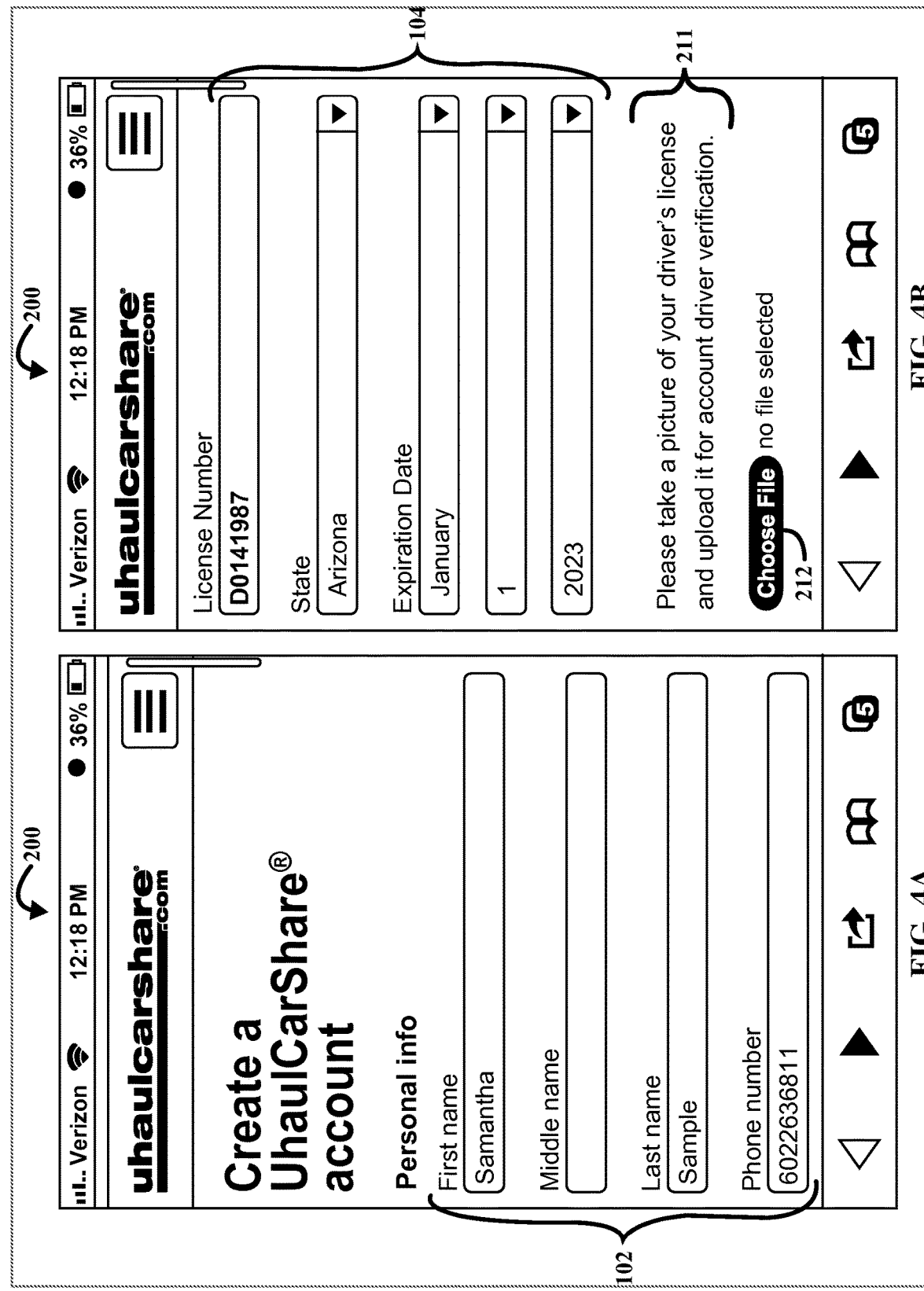

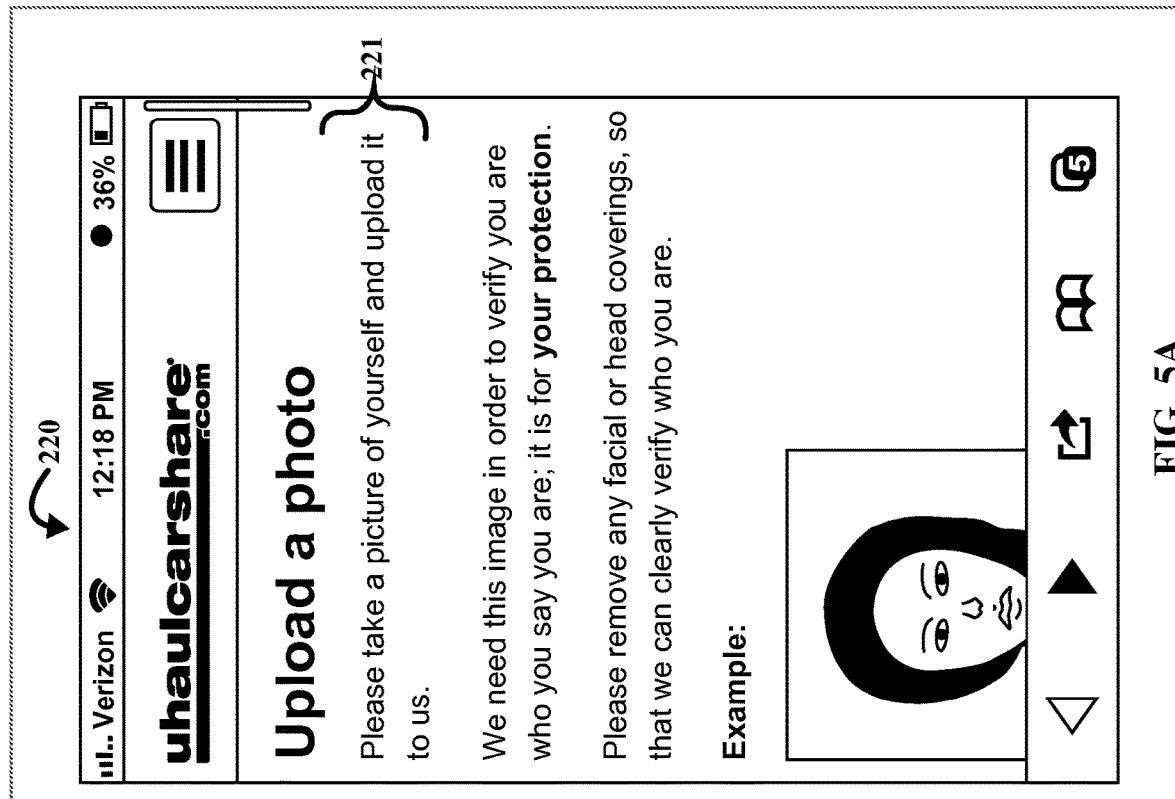

FIG. 10 uhaulcarshare.com 450
Log In & Go

Reserve & Drive

Home | How it works | Work with us | Rewards | News

1. Driver's information (454)

First name: [ ]
Last name: [ ]
Date of birth: [January ▼] [1 ▼] [1982 ▼]

Driver's license#: [ ]
State: [Alabama ▼]
Expiration: [January ▼] [1 ▼] [2017 ▼]

2. Billing information (460)

First name: [ ]
Last name: [ ]
Address: [ ]

ZIP/postal code: [ ]
Email address: [ ]

3. Credit card information (458)

Name on card: [ ]
Credit card#: [ ]
Experation date: [12 ▼] [2014 ▼]
Security code: [ ]

4. Terms and conditions (462)

☐ I agree to the Terms and Conditions.
☐ I will not drive under the influence of drugs or alcohol.
☐ I understand that I can have passengers in the car but I am the only one authorized to drive the car.

464 — [Submit]

877-990-UCAR  info@ucarshare.com  site map
© 2012 Uhaulcarshare. All rights reserved.

FIG. 11 uhaulcarshare.com
*Log In & Go*

480

Home | How it works | Work with us | Rewards | News
Reserve & Drive

Please Confirm

Vehicle:
2007 MINI Clubman

Where:
2727 N Central Ave

When:
Tue, July 31, 8:30AM to
Tue, July 31, 10:30AM

How much:
Estimated cost $14.85 plus $0.49/mile

Tax: $2.37

[Nevermind]    [I'll take it!]

877-990-UCAR  info@ucarshare.com  site map
© 2012 Uhaulcarshare. All rights reserved.

FIG.12

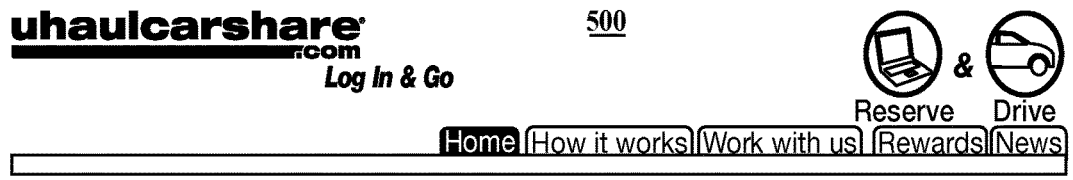

uhaulcarshare 500
Log In & Go

Reserve & Drive

Home | How it works | Work with us | Rewards | News

*Congrats, you're ready to roll!*
Your reservation is for 7/31/2012 at 8AM to 7/31/2012 at 10AM

Vehicle:
2007 MINI Clubman ()

Location:
2727 N Central Ave
Phoenix, AZ 85004

264 Keypad access code:
8675309

Gas refuel code:
286456

Reservation date:
Tue, July 31, 8:30AM to
Tue, July 31, 10:30AM

Estimated cost:
Rental amount:
$14.85

Price per mile:
$0.49/mile

Tax: $2.37

Total:
$14.85 + $0.49/mile be sure to return the car to the same spot you picked it up from or you will be charged a $50 late fee.

If you have any problems, feel free to contact us

877-990-UCAR  info@ucarshare.com  site map
© 2012 Uhaulcarshare. All rights reserved.

223 http://beta.uhaulcarshare.com

Certificate mirror

U-Haul Care Share | Amerco Intranet: Home | Create Account - U...

Recent photos:

300

Thunderbird School of Global Management
Glendale, AZ 85306

Driver's license info
DL number:
　000000000
State:
　AZ
Expiration date:
　1/1/2023

Payment Info
Payment method:
　Own credit card
Description:
　Visa ending in 0007

History 7/8/2013
11:48 AM   Created
11:51 AM   Submitted by customer
11:52 AM   Opened by Mariah Reid

Action

[⊘ Approve] [☒ Deny] [Cancel] [Request more info]  ← 308

304  306

Version 2.1.0 29451 (Debug)

Messageboards   Contact   User policy

Copyright 2013 U-Haul International, Inc. All rights reserved. U-Haul® is a registered trademark of U-Haul International, Inc.

FIG. 15B

METHOD AND APPARATUS FOR REAL-TIME QUALIFICATION OF RENTAL CUSTOMERS

RELATED APPLICATION

This application claims the benefit of U.S. Provisional Application No. 61/859,151, filed Jul. 26, 2013, entitled "Method and Apparatus for Real-Time Qualification of Rental Customers," which is incorporated herein by reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention generally is directed to an online method and system for qualifying rental customers. More particularly, it relates to a method and system that allows a rental company to quickly qualify a rental customer making an online reservation of a rental vehicle, such as a car share rental, without requiring the customer to be a member or have a membership or to be pre-qualified.

With present systems and methods for renting vehicles, such as a car share vehicle, the process for approving a rental customer for a rental transaction (i.e., qualifying the customer) takes longer than is desirable for both the rental company and the customer. It is an object of the present invention to provide a method and apparatus for quickly qualifying rental customers, including car share customers.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification and the appended claims.

SUMMARY

To achieve the foregoing objects, and in accordance with the purposes of the invention as embodied and broadly described in this document, there is provided a method and system for real-time qualification of rental customers. The method and system allows a rental company to quickly qualify a rental customer making an online reservation of a rental vehicle, such as a car share rental, without requiring the customer to be a member or have a membership or to be pre-qualified. According to one aspect of the invention, the customer uses a mobile device to provide information (including a photo or video of the customer) to a rental management computer system for use in a real-time review process for qualifying the customer.

A system for real-time qualification of rental customers according to the invention includes: a database operative to store account information associated with a customer for a rental transaction; an input component operative to receive from the customer an uploaded image of the customer's driver's license and an uploaded second image of the customer; and a processor operative with the database to use the uploaded driver's license image, the uploaded second image and information associated with the uploaded second image to qualify the customer for a rental transaction. The processor is operative to compare the customer's driver's license image to the uploaded second image of the customer and to qualify the customer for the rental transaction if the second image of the customer is uploaded within a pre-defined time before the rental time period begins. In one exemplary embodiment, the pre-defined time before the rental time period begins is about one hour or less. The information associated with the second uploaded image of the customer can include a timestamp associated with the second uploaded image and/or a GPS location associated with the uploaded image. In an exemplary embodiment, the processor is operative to simultaneously display the customer's driver's license image and the uploaded second image for comparison by an administrator.

A method for online real-time qualification of rental customers according to the invention includes the steps of: storing in a computer database rental transaction information and/or qualification information associated with a customer for reserving a rental item for a rental time period; with a website, prompting the customer to upload an image from the customer's driver's license; with the website, prompting the customer to upload a second image of the customer; and using the uploaded driver's license image and the uploaded second image and information associated with the uploaded second image to qualify the customer for a rental transaction.

According to a one method of the invention, the step of using the uploaded driver's license image and the uploaded second image and information associated with the uploaded second image to qualify the customer for a rental transaction includes comparing the customer's driver's license image to the uploaded second image of the customer. Preferably, the second image of the customer must be uploaded within a pre-defined time before the rental time period begins to qualify the customer for the rental transaction. For example, the pre-defined time before the rental time period begins can be about one hour or less. The information associated with the second uploaded image of the customer can include a timestamp associated with the second uploaded image and/or a GPS location associated with the uploaded image. The customer's driver's license image and the uploaded second image can be simultaneously displayed for comparison by an administrator.

The qualification information associated with the customer can include, among other items: (i) whether the customer has previously rented a vehicle using the rental management computer system; (ii) whether the customer has previously purchased any other good or service from the entity that is operating the rental management computer system; (iii) the time of the rental; (iv) the location of the rental; (v) a comparison of the customer's uploaded photo or video with an image of the customer's driver's license; (vi) comparison of the meta data contained on the customer's uploaded photo or video to the location and timing of the rental; (vii) a comparison of the customer's uploaded photo or video with previously uploaded photos or videos; (viii) a comparison of the location of the rental with the geographic information on the customer's driver's license, such as the state of issuance; and/or (ix) the results of a dexterity test that can be performed by the customer using the mobile device.

With the method and system of the invention, a vehicle rental customer—such as car share rental customer—can rent and obtain access to a vehicle in minutes without waiting days for approval or waiting for a membership card in the mail.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

FIGS. 2A and 2B show an exemplary screen display of an account creation page of a website according to the present invention, which page allows a rental customer to provide information for establishing an account with the rental management computer system via the website.

FIGS. 4A-4D show an exemplary mobile version of an account creation page of the website displayed on the screen of a mobile computer device.

FIGS. 5A-5C show an exemplary mobile version of a photo upload page of the website, which a customer can use to upload a photo or video for use in the rental qualification process.

FIGS. 7A and 7B show an exemplary mobile version of a confirmation web page displayed on the screen of the mobile computer device, which depicts the confirmation of a customer's rental vehicle reservation after the customer has been qualified.

FIG. 9 shows an exemplary embodiment of a vehicle selection web page, with which a customer can select a car for rental from a car share.

FIG. 10 shows an exemplary embodiment of a reservation web page, from which the user can select a pick-up date and time period for the rental.

FIG. 11 shows an exemplary embodiment of a rental submission web page, which prompts the customer to enter the customer's drivers license information, billing address information, and payment method information.

FIG. 12 shows an exemplary embodiment of a confirmation web page, from which a customer can confirm their requested reservation FIG. 13 shows an exemplary embodiment of a verification web page, which verifies the completion of a customer's rental reservation.

FIGS. 15A and 15B show one exemplary embodiment of an administrative approval web page that an administrator of the rental management computer system can use to review a rental customer's information and qualify the customer in accordance with the present invention

DESCRIPTION

Reference will now be made in more detail to presently preferred embodiments of the invention. While the invention is described more fully with reference to these examples, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

According to the present invention, a rental management computer system is used to manage and provide rental services, such as car sharing rentals, to customers. A rental customer can use a mobile computer device, such as a smart phone, to communicate with the rental management computer system to provide information that can be used to quickly qualify the customer for a rental transaction, including an image of the customer's driver's license and an image of the customer. In a preferred embodiment of the invention, this communication takes place via the mobile device through the Internet. Although the present invention is described with respect to car sharing rentals, it will be understood that it also can be used with rentals of other types of equipment or vehicles, including trucks for self-moving.

Computer Network System

Figure 1:
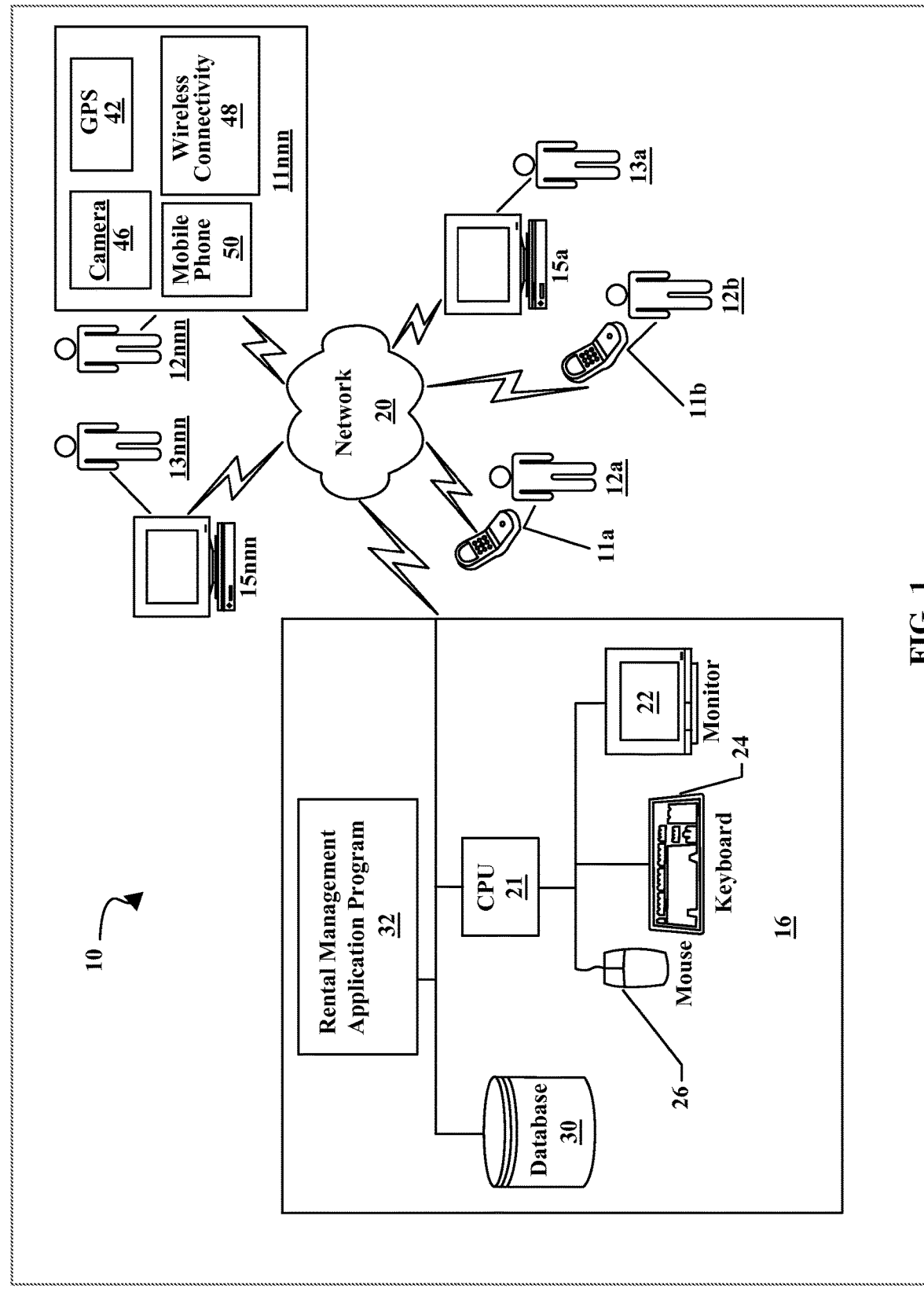
FIG. 1 is a functional block diagram of a preferred computer system and a network for practicing the present invention, including a rental management computer system (which can be used to host a website), and mobile computer devices.

FIG. 1 illustrates a preferred computer network system 10 for practicing the present invention. The computer network system 10 includes a rental management computer system 16, which hosts a website and stores and processes the information described below for creating an account for a customer, quickly qualifying the customer for a rental transaction, processing the transaction and confirming the transaction to the customer. Customers 12 can access and communicate with the rental management computer system 16 via mobile computer devices 11a, 11b and 11nnn, (where nnn refers to any number of users and user devices) coupled to the rental management computer system 16 via a computer network 20, such as the Internet, or by other suitable communications means. In addition, in a presently preferred embodiment, rental customers 13a-13nnn can use computers 15a-15nnn coupled to the computer system 16 via the computer network 20. In a preferred embodiment of the invention, the computer network 20 comprises the Internet and the mobile computer devices 11 and computers 15 each have a web browser application for accessing content on the World Wide Web. The mobile computer device 11 can be, by way of example, a smart phone or similar device. In a preferred embodiment, the mobile computer device 11 includes a web browser, a global positioning system (GPS) program 42, a digital camera 46, wireless connectivity 48 and a mobile telephone 50. Upon reading this specification, those skilled in the art will understand that, under appropriate circumstances, considering issues such as developments in computer hardware, software and connectivity, etc., other network configurations and devices also may suffice. For example, the mobile computer device 11 can be any mobile device suitable for communication over the Internet, including without limitation, smartphone, PDA, handheld mobile digital electronic device, tablet computer, portable computer or the like.

Still referring to FIG. 1, the rental management computer system 16 includes a central processing unit (CPU) 21 for processing data and program instructions. The rental management computer system 16 also includes input and output devices, as is well known in the art. For example, the rental management computer system 16 preferably includes a display screen or monitor 22, a keyboard 24, a mouse 26, a printer (not shown), etc. The rental management computer system 16 further includes data storage and memory devices, as are known in the art, for storing a database 30. The database 30 is used to store customer data and other rental data required to provide the functionality described below. Preferably, the database 30 is a relational database, as is well known in the art. A rental management application program 32 is operable with the database 30 and the mobile computer device 11 to provide the functionality described below. In a presently preferred embodiment, the rental management application program 32 is written using the ASP.NET MVC framework utilizing the Model-View-Controller (MVC) architectural pattern, marketed by Microsoft Corporation of Redmond, Wash. The database 30 is implemented using the SQL Server database management system, also marketed by Microsoft Corporation. Upon reading this specification, those skilled in the art will understand that, under appropriate circumstances, considering issues such as developments in computer hardware, software and connectivity, etc., other operating systems, programming languages and database management systems can be used.

Customer Interface

FIGS. 2-3 and 9-14 show exemplary web pages served by the rental management computer system 16 to a customer computer 15, through which the customer can create an account and reserve a vehicle.

Figure 2A:

As shown in FIG. 2, an account creation page 100 includes personal information fields 102 (e.g., for a customer to enter his or her name, telephone number and date of birth), drivers license information fields 104 (for entering the customer's driver's license information), account login information fields 106, payment method information fields 108 and billing address information fields 110. The account creation page 100 prompts a user to enter the information into these fields to create an account. The account creation page 100 includes an instruction 111 to take a picture of the customer's driver's license for uploading to the system 16. A browse button 112 allows the customer to browse his or her image files (e.g., the image files stored locally on the customer computer 15) for the driver's license photo. After providing the information prompted by the account creation page 100, the customer can create an account by selecting a Create Account button 114, which causes the entered information, including the customer's driver's license photo, to be uploaded to the system 16.

Figure 9:
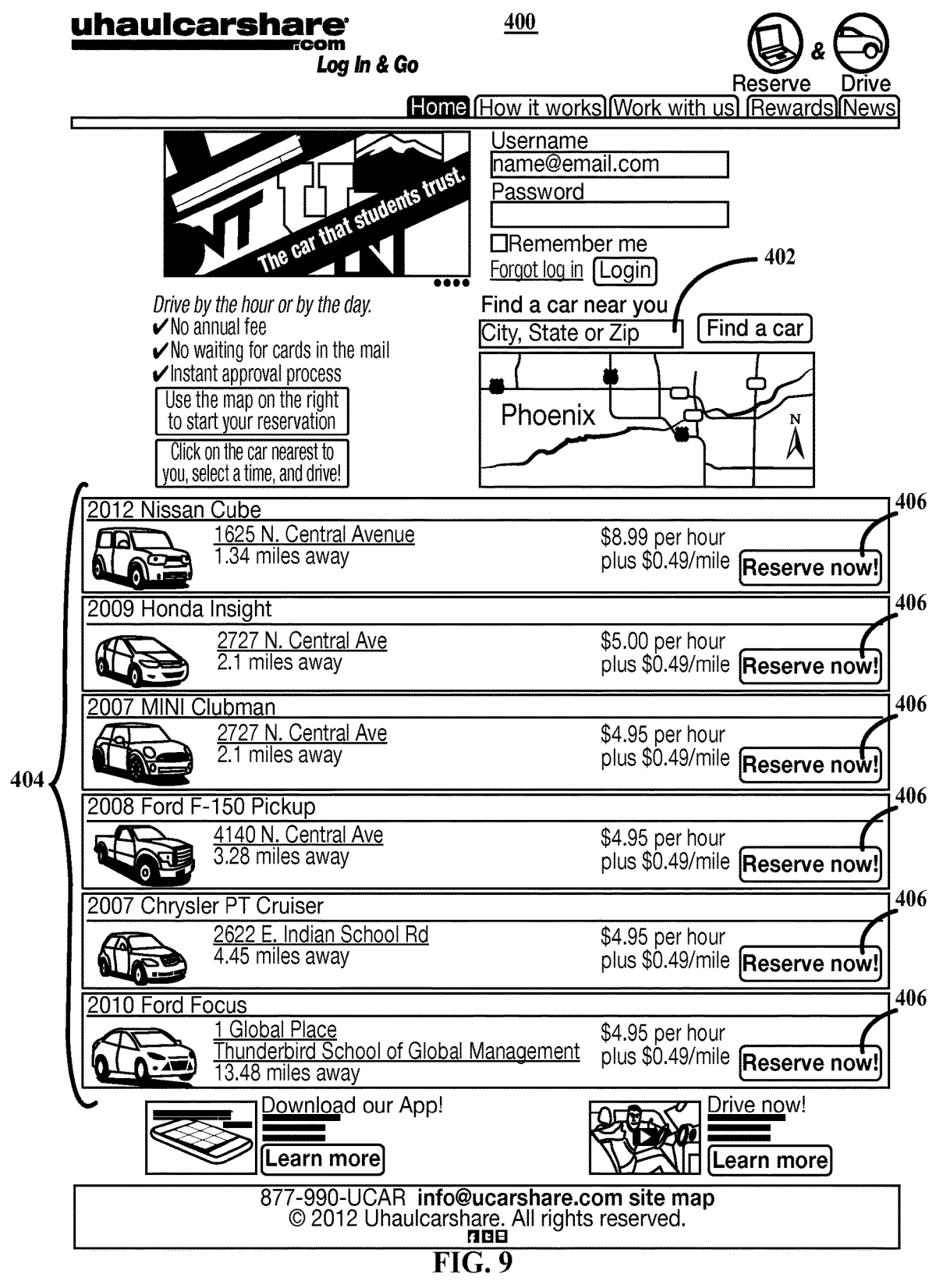
Figure 10:
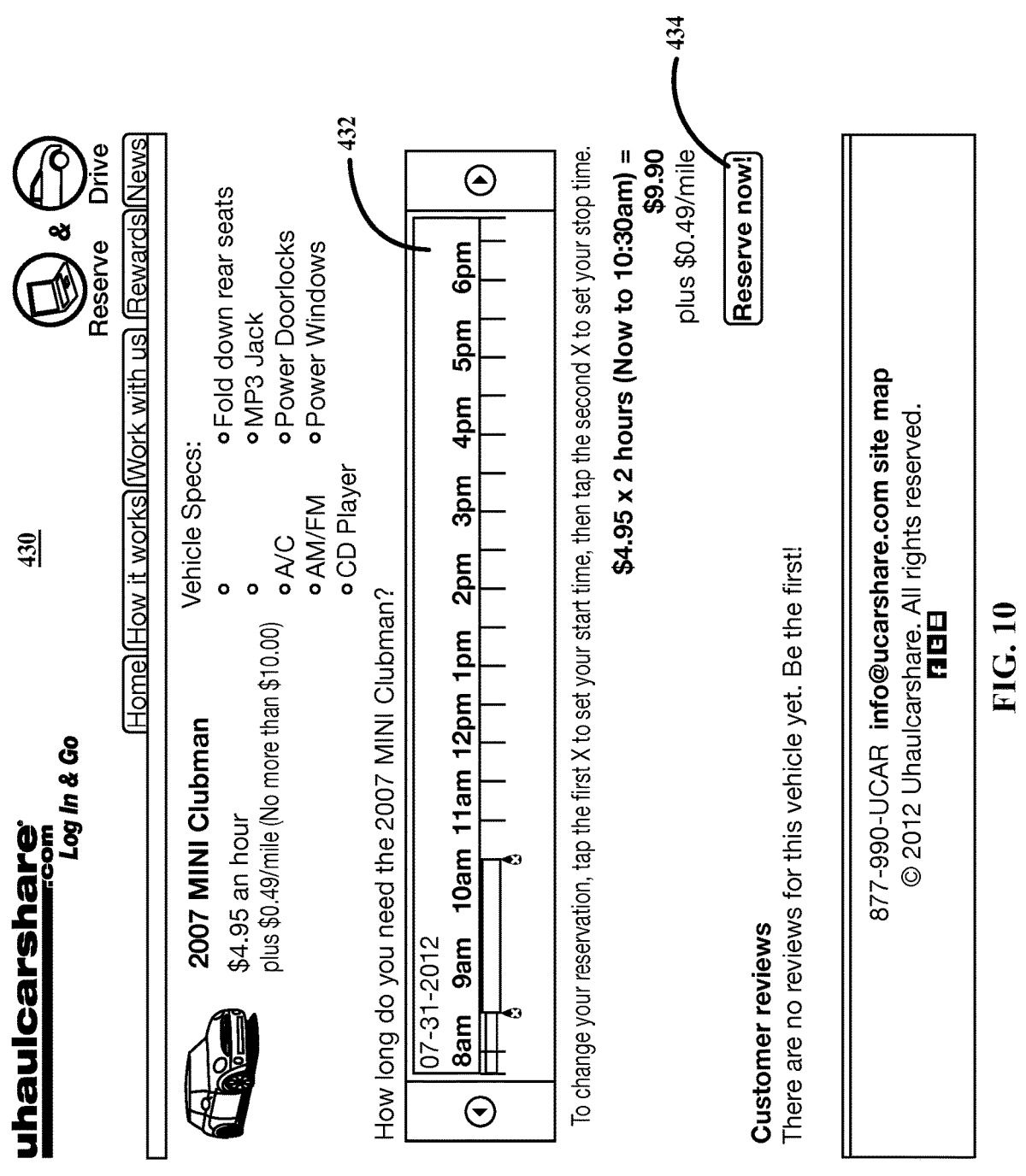

After a customer's account is created, the customer can select a vehicle to reserve for rental. FIG. 9 shows one exemplary embodiment of a vehicle selection page 400 with which a customer can select a car for rental from a car share. It will be understood that the vehicle selection page 400 also can be displayed so that a potential customer can view vehicle information and select a vehicle of interest before he or she creates an account. Using the vehicle selection page 400, the user can find the closest vehicle using GPS or can search by city/state or zip code by entering that location information into a search field 402, which causes the system 16 to display vehicle availability information 404. The user can then select the vehicle that he or she wants to reserve by clicking on the appropriate Reserve Now button 406. In response, the system 16 displays a reservation page 430, as shown in FIG. 10, from which the user can select a pick-up date and time period for the rental. In the embodiment of FIG. 10, the user can select the rental time period by using a rental timeline input section 432. It will be understood, however, that the inputs for the rental date and time period can be provided via other forms of input fields, such as via drop-down lists, a date and time picker, or the like. After the user enters a rental date and time period and clicks on the Reserve Now button 434, the requested rental information is uploaded to the rental management computer system 16.

In some embodiments, the system 16 will display rental submission page 450, as shown in FIG. 11, which prompt the customer to enter information in driver's license information fields 454 (for entering the customer's drivers license information), payment method information fields 458 and billing address information fields 460. If the customer already has an account, the system 16 can pre-populate these fields with information previously provided by the customer and stored in the database 30. In addition, as shown in FIG. 11, the system 16 requires the customer to agree to certain terms and conditions of the rental 462. The customer can then submit the rental request by clicking on the Submit button 464, and the system 16 will display a confirmation page 480 as shown in FIG. 12, from which the customer can confirm the rental request.

Figure 3:
FIG. 3 shows an exemplary screen display of a photo upload page of the website, which a customer can use to upload an image for use in the rental qualification process according to the invention.

Referring back to FIG. 3, as part of the rental qualification process, the system 16 requires a user to upload a photo or video of the customer to compare against the customer's driver's license photo that previously has been uploaded to the system 16 and stored in the database 30. FIG. 3 shows an exemplary screen display of a photo upload web page 120 served by the system 16, which can be used for this purpose. The photo upload page 120 includes an instruction 121 to the customer to take a picture of himself or herself and to upload that picture for comparison to the customer's stored driver's license photo. A browse button 122 allows the customer to browse the computer files to select the customer photo to be uploaded. Once the customer photo is selected, it can be uploaded to the system 16 by selecting an upload button 123.

Referring to FIG. 13, after a customer is qualified for a requested rental transaction, the rental management computer system 16 can cause the customer computer 15 to display a verification page 500 that verifies the customer's rental reservation. This verification can include a code for accessing the rental vehicle, such as a keypad access code 264.

Mobile User Interface

In one presently preferred embodiment, the customer can create an account and communicate with the rental management computer system 16 using a mobile computer device. Referring to FIGS. 4-7, the functionality and operation of the mobile computer device 11 will now be illustrated in connection with a more detailed description of the user interface of that device.

Figure 4C:
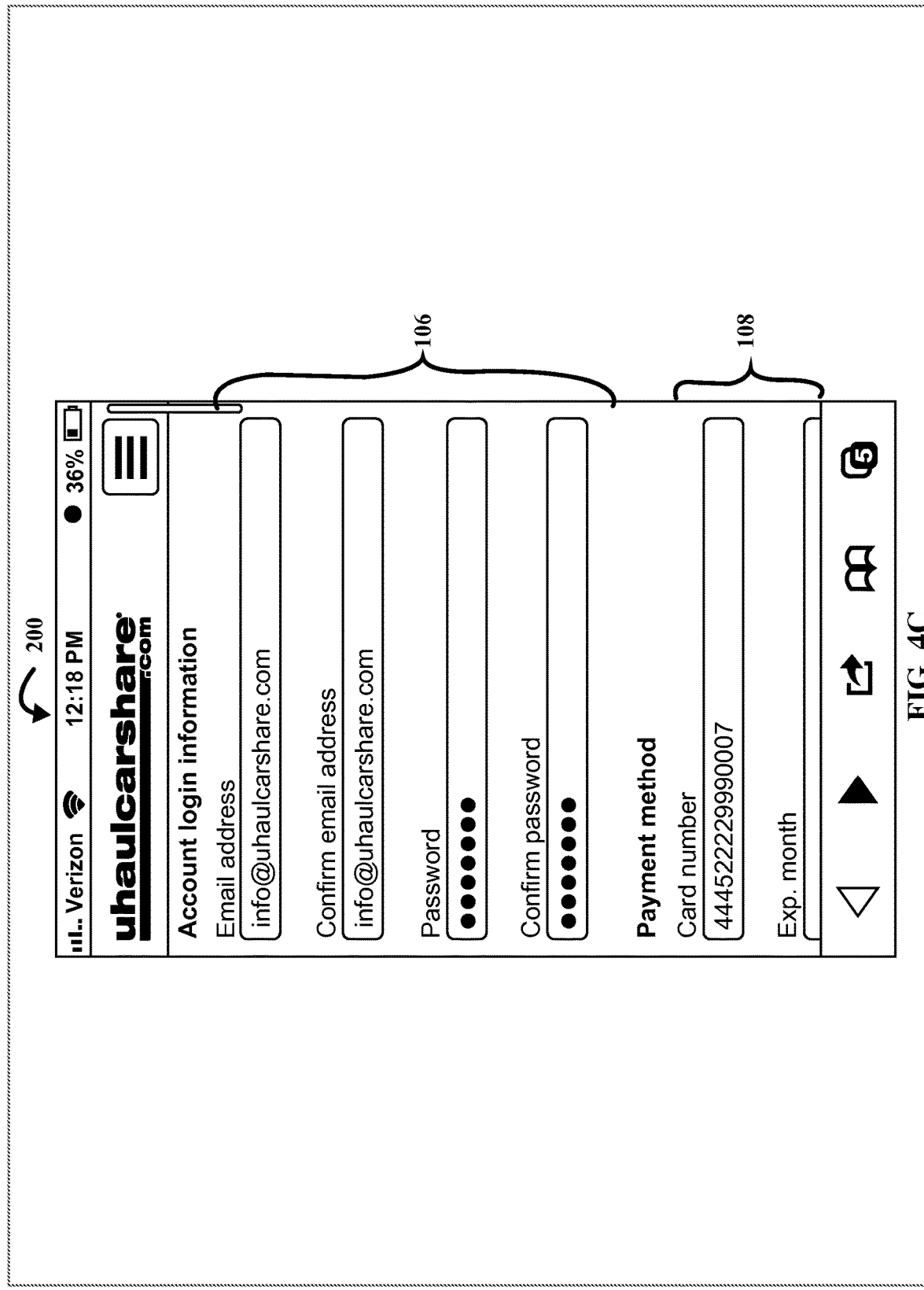

FIGS. 4A-4D show an exemplary mobile account creation page 200 served by the system 16 and displayed on the screen of the mobile computer device 11. Similar to the embodiment of the account creation page 100 described above, the mobile account creation page 200 prompts a user to enter the information into personal information fields 102 (see FIG. 4A), driver's license information fields 104 (see FIG. 4B), account login information fields 106 (see FIG. 4C), payment method information fields 108 (see FIG. 4C) and billing address information fields 110 (see FIG. 4D). As shown in FIG. 4B, the mobile account creation page 200 can include an instruction 211 to prompt a customer 12 to upload, as part of the driver's license information, an image of his or her driver's license (which can be taken with and stored on the mobile computer device 11). The user can designate the driver's license image to be uploaded file by selecting the Choose File button 212.

After providing the information prompted by the mobile account creation page 200, the customer can create an account by selecting a Create Account button 114 (see FIG. 4D), which causes the entered information, including the customer's driver's license photo, to be uploaded to the system 16 and stored in the database 30.

Figure 5C:
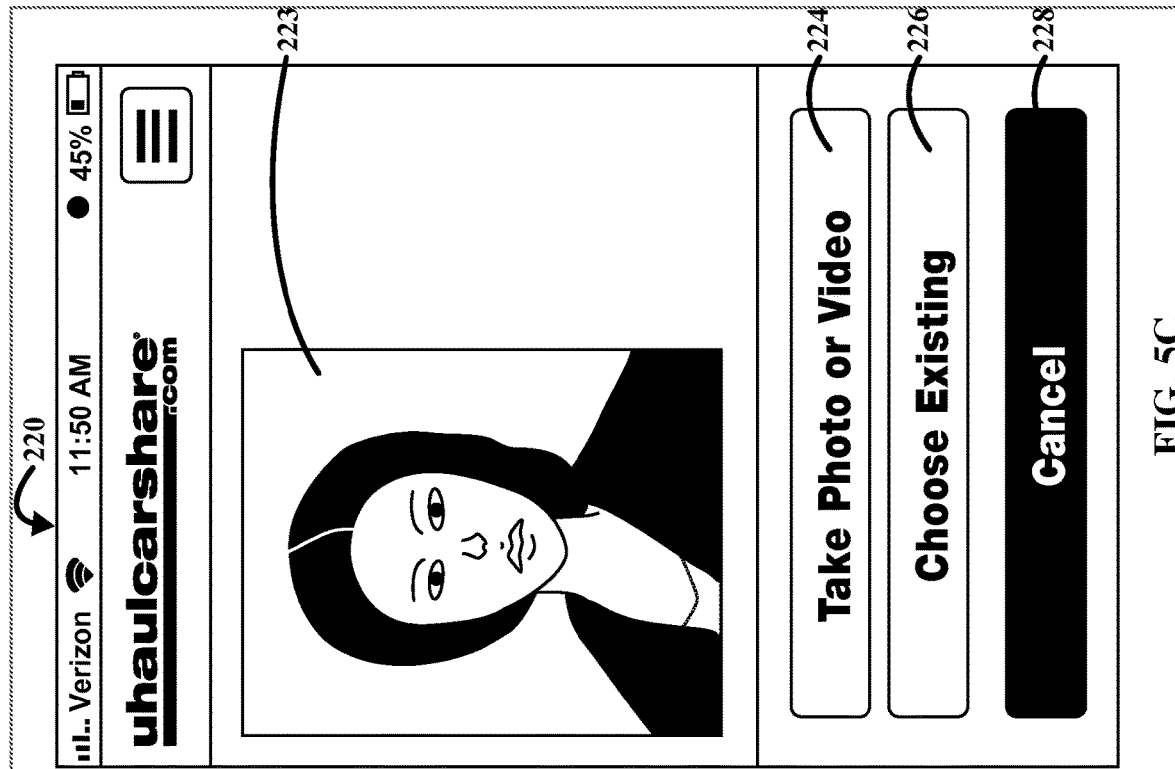
Figure 5B:
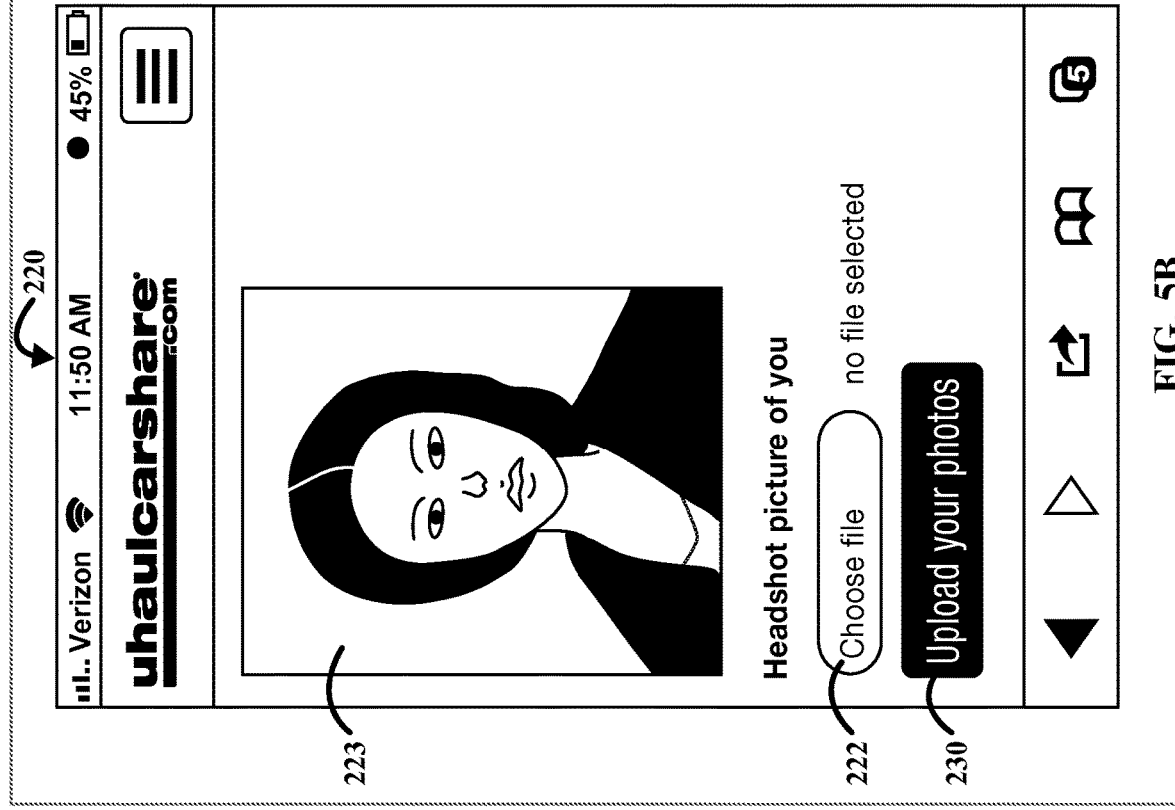

As previously described, as part of the rental qualification process, the system 16 requires a user to upload a photo or video of a rental customer to compare against a customer's driver's license photo previously uploaded to the system 16 and stored in the database 30. FIGS. 5A-5C show an exemplary mobile photo upload page 220 displayed on the screen of the mobile computer device 11, which page can be used for this purpose. The mobile photo upload page 220 includes an instruction 221 to the customer to take a photo or video of himself or herself and to upload it for comparison to the customer's stored driver's license photo (see FIG. 5A). Preferably, the customer can use the camera 46 of their mobile computer device 11 to take such a photo or video. As shown in FIG. 5B, the mobile photo upload page 220 can include a Choose File button 222. When the customer selects the Choose File button 222, the system 16 causes the mobile photo upload page 220 to display a Take Photo or Video button 224 and a Choose Existing button 226, a shown in FIG. 5C. By selecting the Choose Existing button 226, the customer can browse computer files (e.g., the video and image files stored locally on the mobile computer device 11) for the customer photo or video to be uploaded.

If the customer chooses the Take Photo or Video button 226, the mobile computer device 11 can enable the camera 46 so that the customer can take a photo or video of himself or herself for uploading. After a photo or video has been chosen for uploading, the mobile computer device 11 will display the chosen image 223 as well as an Upload Your Photos button 230, as shown in FIG. 5B. When the user selects the Upload Your Photos button 230, the mobile computer device 11 uploads the chosen photo or video file to the system 16, which stores the chosen photo or video file for comparison with the uploaded image of the customer's driver's license photo.

In a preferred embodiment, to assure that the customer photo or video is current, it must be taken and uploaded within a pre-defined time before the rental period begins. In one exemplary embodiment, the photo or video must be taken and uploaded one hour or less before the selected reservation time period begins. Timestamp information associated with the photo or video file can be used by the system 16 to assure that the uploaded file is sufficiently current. Similarly, other information associated with the uploaded file, such as the GPS location associated with the file, can be used to qualify the customer.

Figures 6A, 6B:
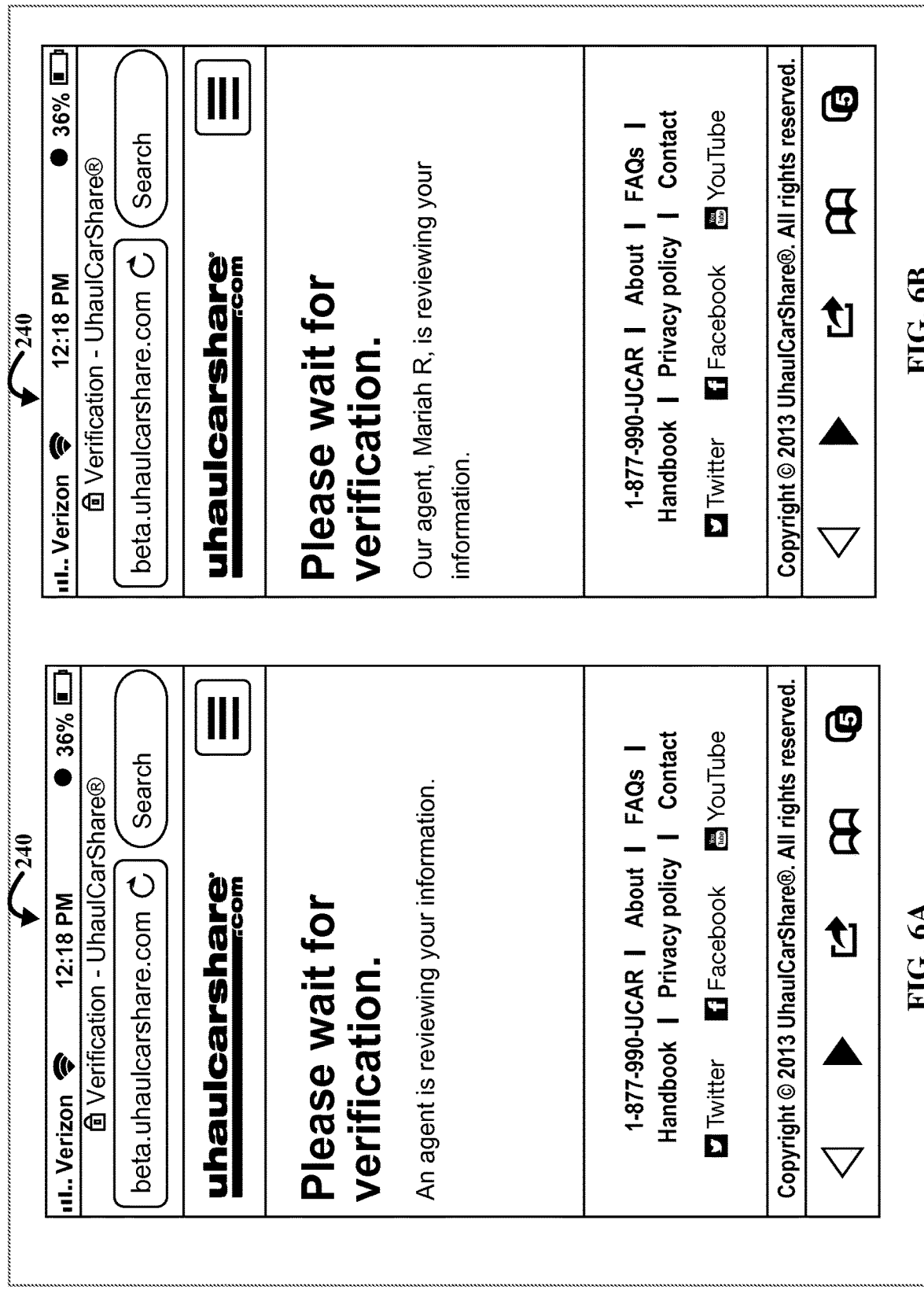
FIGS. 6A and 6B show an exemplary mobile version of a verification web page displayed on the screen of the mobile computer device, showing the status of the review of the customer's information for qualifying the customer in accordance with the present invention.

Referring to FIGS. 6A and 6B, after the customer's photo is uploaded, the rental management computer system 16 serves the mobile device 11 a mobile verification page 240, which shows the status of the customer qualification process. For example, as shown in FIGS. 6A and 6B, the mobile verification page 240 can display a message indicating that a reviewing agent is reviewing the information relating to the requested rental. This process can involve a review of various qualifying factors, including for example:

Whether the customer has previously rented a vehicle using the rental management computer system 16;
Whether the customer has previously purchased any other good or service from the entity that is operating the rental management computer system 16;
The time of the rental;
The location of the rental;
A comparison of the customer's uploaded photo or video with the image of the customer's driver's license;
Comparison of the meta data associated with the customer's uploaded photo or video to the location and timing of the rental;
A comparison of the customer's uploaded photo or video with previously uploaded photos or videos;
A comparison of the location of the rental with the geographic information on the customer's driver's license, such as the state of issuance; and
The results of a dexterity test that can be performed by the customer using the mobile device, If the reviewing agent needs additional information, such as a better photograph of the customer, the agent can communicate a request directly to the customer for the additional information via the customer's mobile device 11, such as via a pop-up box displayed on the mobile computer device 11 for sending a text message or email.

Figures 7A, 7B:
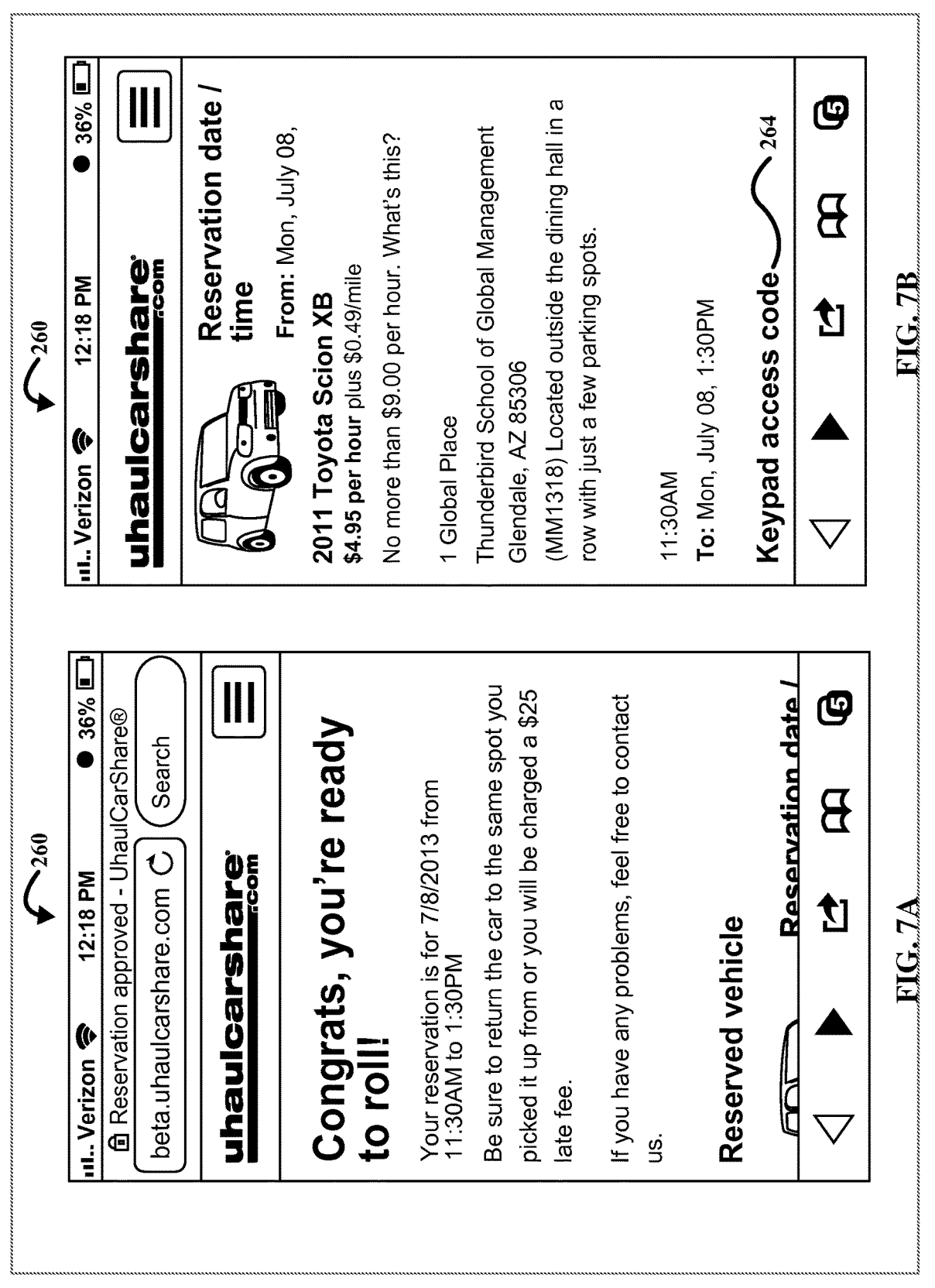

Referring to FIGS. 7A and 7B, after a customer is qualified for a requested rental transaction, the rental management computer system 16 can cause the mobile computer device 11 to display a mobile verification page 260 that verifies the customer's rental reservation. This verification can include a code for accessing the rental vehicle, such as a keypad access code 264.

Figure 8:
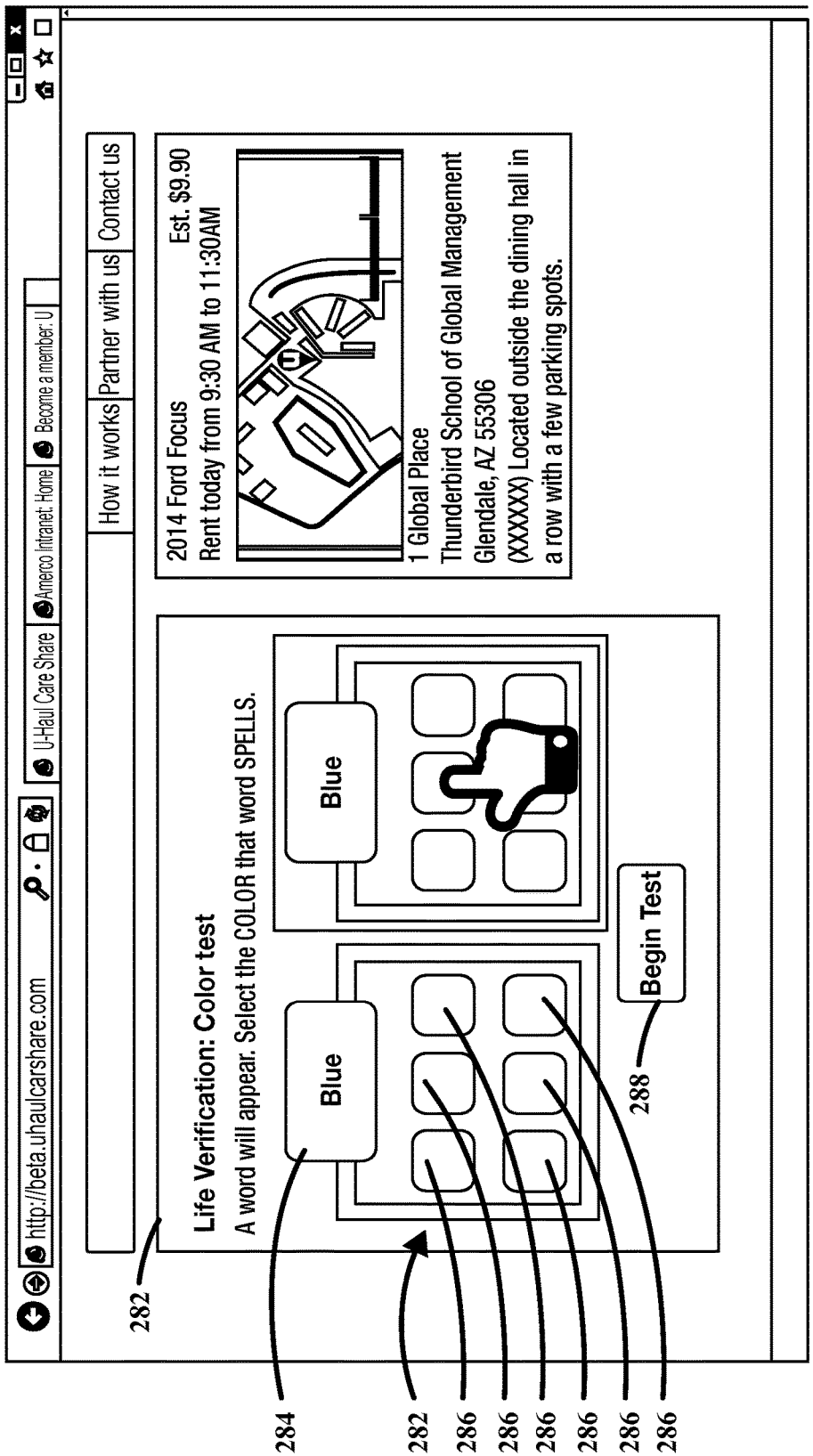
FIG. 8 shows an exemplary embodiment of a live verification test web page for presenting a dexterity test to a customer as part of a rental qualification process.

As mentioned above, one of the factors in qualifying a customer for a rental transaction can be the results of a dexterity test that can be performed by the customer using the mobile computer device 11. FIG. 8 shows one exemplary embodiment of a live verification test page 280 for presenting such a dexterity test. The live verification test page 280 includes a color test section 282, which displays a word 284 that describes a color and a keypad that includes key buttons 286 of various colors. When the customer selects a Begin Test button 288, the system will display word 284 that describes a color, and the customer must select the colored key button 286 that matches the described color. The customer's performance on the test, including the customer's response time and accuracy of response can be captured by the mobile device 11 and uploaded to the rental management computer system 16. To test the customer's dexterity, the live verification test page 280 can present one or a series of such tests.

Figure 14:
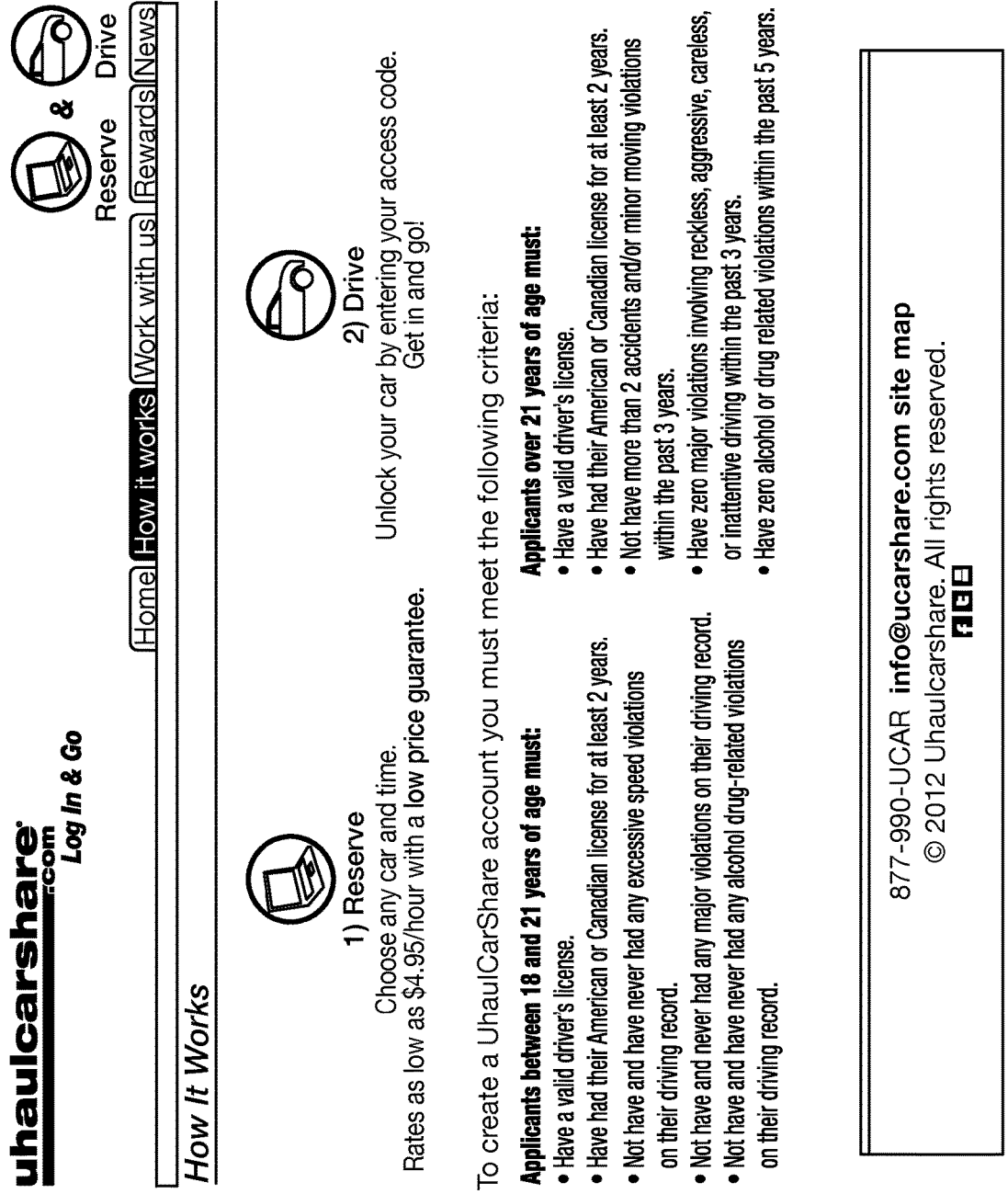
FIG. 14 shows one embodiment of a web page describing some criteria that a customer must meet in order to rent a vehicle according to one exemplary rental qualification process in accordance with the present invention.

FIG. 14 shows an embodiment of an informational web page describing some criteria that a customer must meet in order to rent a vehicle according to one exemplary rental qualification process in accordance with the present invention.

Administrator Interface

Figure 15A:
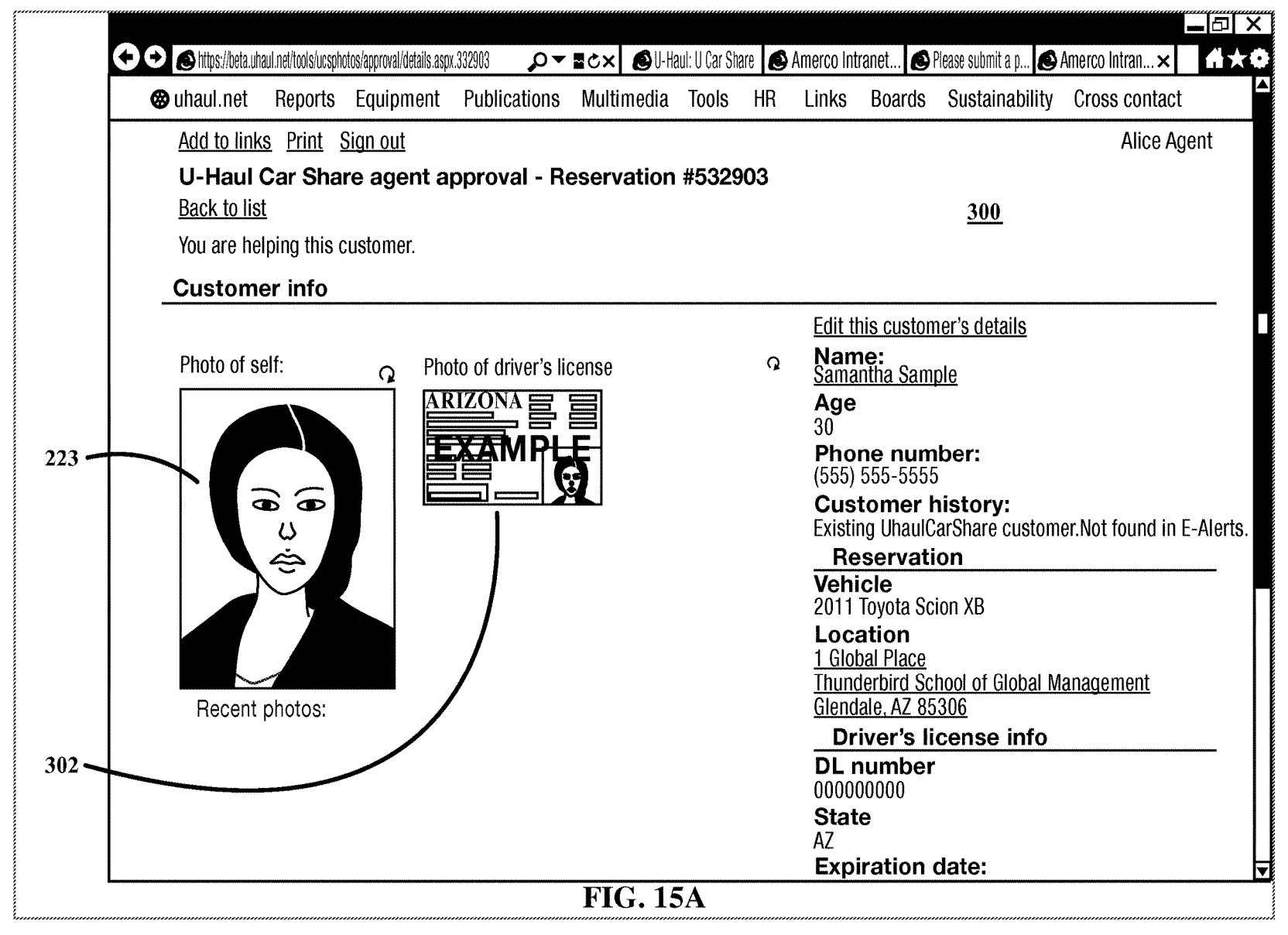

FIGS. 15A-15B show an exemplary embodiment of a screen display of an administrative approval web page 300 for use by an administrator in qualifying a rental customer.

The administrator can use this web page 300 to view information stored in the database 30 relating to the customer qualification, including simultaneously displaying and comparing the customer's uploaded current photo 223 with his or her driver's license 302 (as shown in FIG. 15A), and to select buttons to approve the rental transaction 304, to deny the transaction 306 or to request more information from the customer 308 as described above.

Figure 16A:
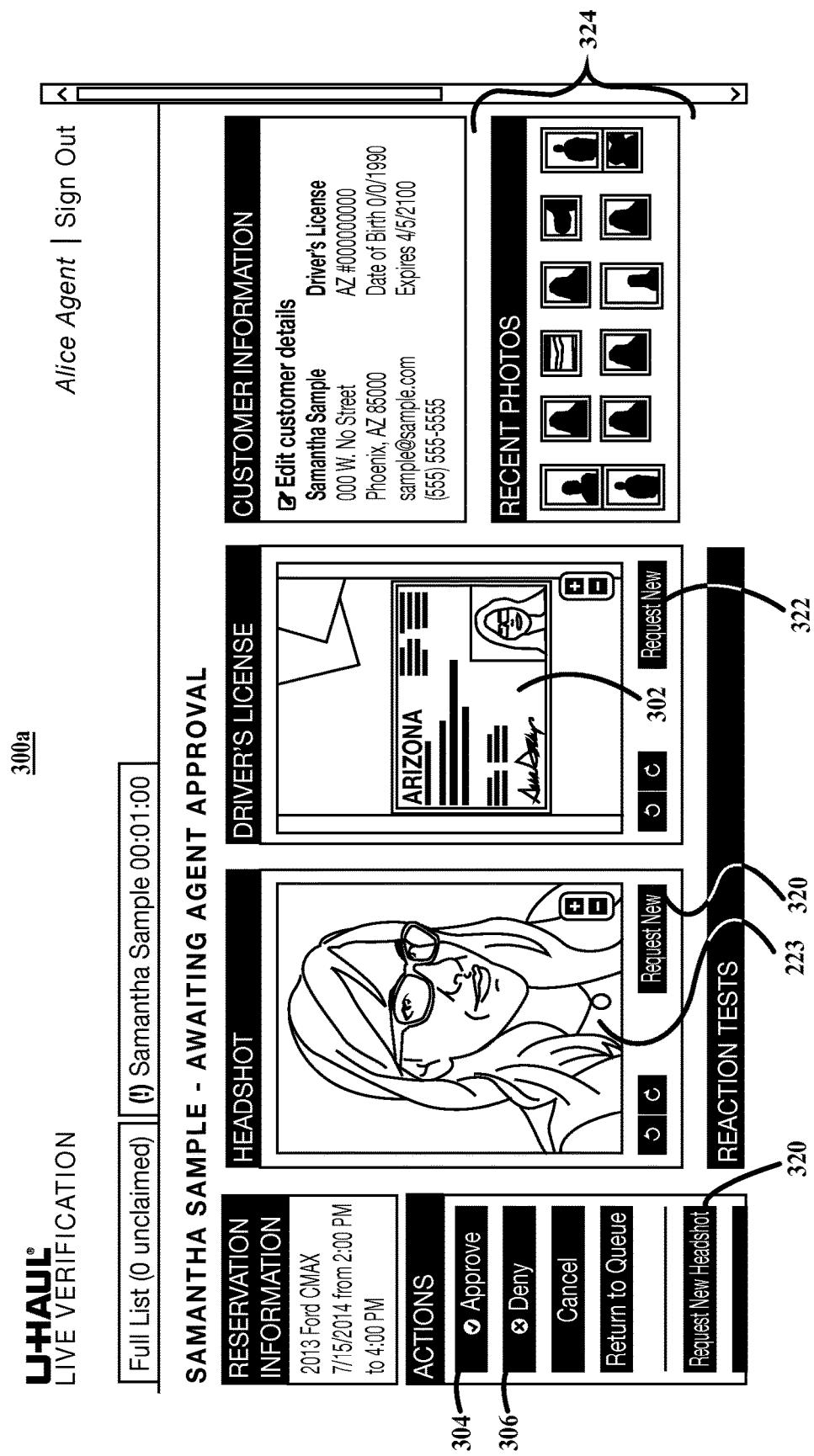
FIGS. 16A and 16B show another exemplary embodiment of an administrative approval web page in accordance with the present invention.
Figure 16B:
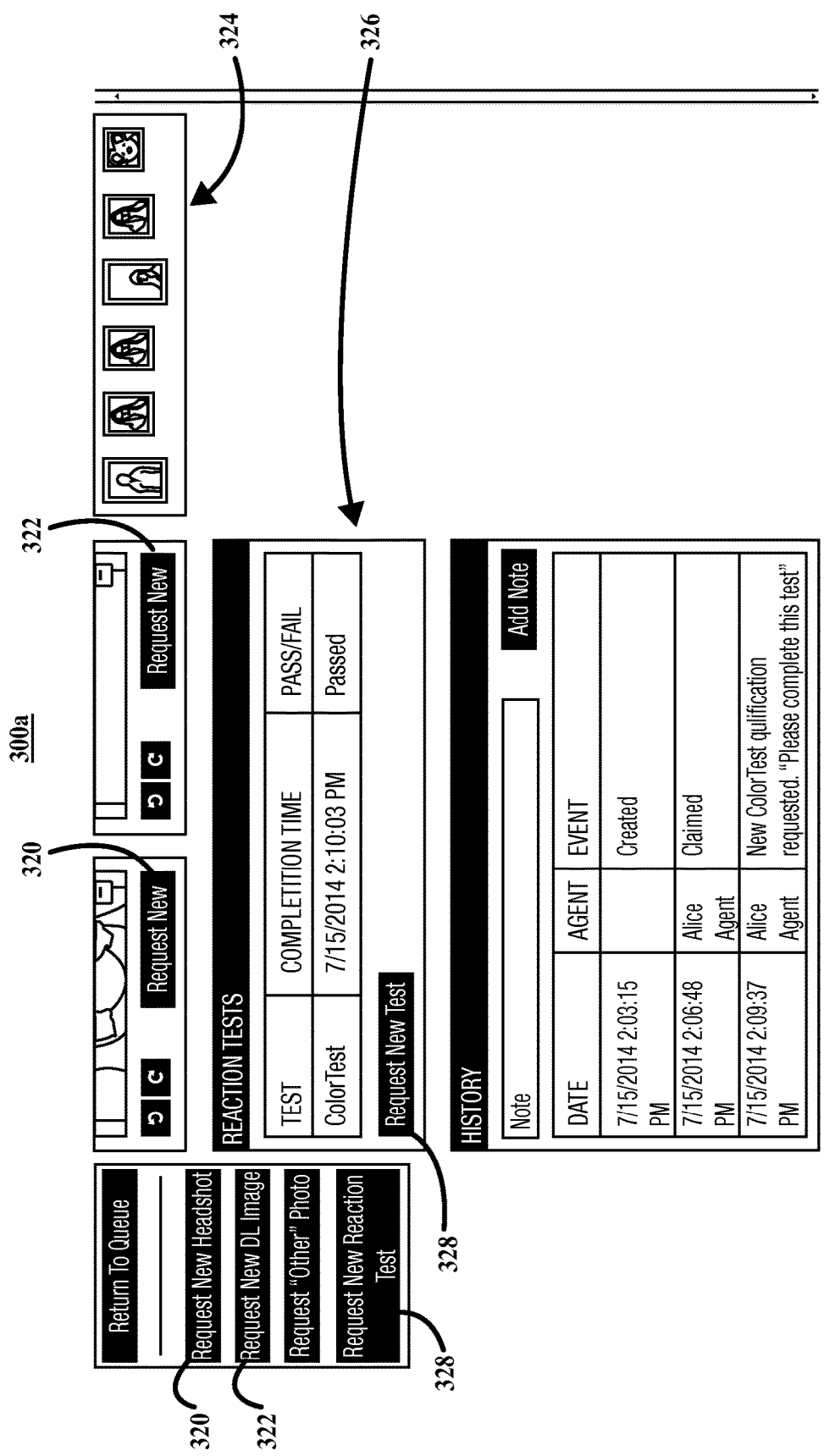

FIGS. 16A-16B show another exemplary embodiment of a screen display of an administrative approval web page 300a for use by an administrator in qualifying a customer for a rental transaction. Like the administrative approval web page 300 of FIG. 15, the administrator can use the web page 300a to view information stored in the database 30 relating to the customer qualification, including comparing the customer's uploaded current photo 223 with his or her driver's license 302 (as shown in FIG. 15A), and selecting buttons to approve the rental transaction 304, to deny the transaction 306 or to request more information from the customer 308 as described above. In addition, the administrative approval web page 300a includes selection buttons for requesting a new photo from the customer 320 and requesting a new driver's license image from the customer 322. Also, the administrative approval web page 300a includes a recent photos section 324 that displays recent photos of the customer stored in the database 30, which can be compared to the uploaded current photo 223, and a reaction test result section 326 that displays the results of the dexterity test taken by the customer. A Request New Test button 328 is provided to allow the administrator to request the customer to take a new dexterity test.

Upon reading this disclosure, those skilled in the art will appreciate that various changes and modifications may be made to the preferred embodiments of the invention and that such changes and modifications may be made without departing from the spirit of the invention. Therefore, the invention in its broader aspects is not limited to the specific details, representative devices, and illustrative examples shown and described. Accordingly, departures may be made from such details without departing from the spirit or scope of the general inventive concept.

What is claimed is:

1. A method for real-time qualification of rental customers, the method comprising:
    storing in a computer database rental transaction information associated with a customer for reserving a rental item for a rental time period;
    with a website including a processor in communication with the computer database, prompting the customer to upload an image from the customer's driver's license having a first image of the customer;
    with the website, prompting the customer to upload from a mobile device a second image file that includes a second image of the customer and metadata associated with the second image of the customer;
    extracting, from the upload of the second image file, time and location information associated with the second image of the customer;
    with the website, causing a mobile device to display a dexterity test to be taken by the customer using the mobile device, causing the mobile device to capture response information for the dexterity test taken by the customer regarding response time and accuracy, receiving from the mobile device the captured response information for the dexterity test, and automatically calculating a dexterity test result based on the captured response information for the dexterity test;
    using the uploaded image from the customer's driver's license, the uploaded second image of the customer, the extracted time and location information associated with the uploaded second image of the customer, and the dexterity test result to qualify the customer for a rental transaction; and
    with the website automatically generating an electronic access code associated with the rental transaction for accessing the rental vehicle and automatically sending the access code to the mobile device.

2. The method of claim 1 wherein the step of using the uploaded image from the customer's driver's license, the uploaded second image of the customer and the extracted information associated with the uploaded second image to qualify the customer for a rental transaction includes comparing the image from the customer's driver's license to the uploaded second image of the customer.

3. The method of claim 1 wherein the second image of the customer must be uploaded within a pre-defined time before the rental time period begins to qualify the customer for the rental transaction.

4. The method of claim 3 wherein the pre-defined time before the rental time period begins is one hour or less.

5. The method of claim 1 wherein the information associated with the uploaded second image of the customer includes a timestamp associated with the uploaded second image of the customer.

6. The method of claim 1 wherein the extracted information associated with the uploaded second image of the customer includes a GPS location associated with the uploaded second image of the customer.

7. The method of claim 2 wherein comparing the image from the customer's driver's license to the uploaded second image of the customer includes simultaneously displaying the image from the customer's driver's license and the uploaded second image of the customer for comparison by an administrator.

8. The method of claim 1 further comprising with the website (i) causing the mobile device to display a user interface element for selecting the rental vehicle, (ii) receiving from the mobile device GPS location information for the mobile device, and (iii) using the received mobile device GPS location information to cause the mobile device to display on the mobile device rental information about one or more vehicles that are available for rental and are close to the mobile device.

9. The method of claim 1 further comprising, with the website (i) causing the mobile device to display a rental timeline input element for selecting a time period for the vehicle rental, (ii) automatically calculating the rental time period and rental charges based on a start time and a stop time entered via the mobile device rental timeline input element, and (iii) automatically causing the mobile device to display the calculated rental time period and rental charges.

10. A method for online real-time qualification of rental customers, the method comprising:
    storing in a computer database rental qualification information associated with a customer for reserving a rental item for a rental time period;
    with a website, prompting the customer to upload a first image file including an image from the customer's driver's license having a first image of the customer;
    with the website, prompting the customer to upload a second image file that includes a second image of the customer and metadata associated with the second image of the customer;

extracting information from the metadata associated with the second image of the customer, including information sufficient to determine a time and location associated with the second image of the customer;

with the website displaying on a mobile device a dexterity test to be taken by the customer using the mobile device, causing the mobile device to capture response information for the dexterity test regarding response time and accuracy of the customer's response, receiving from the mobile device the captured response information for the dexterity test, and automatically calculating a dexterity test result based on the captured response information for the dexterity test; and using the uploaded image from the customer's driver's license, the uploaded second image of the customer, the information extracted from the metadata associated with the uploaded second image of the customer, the dexterity test result and the stored qualification information associated with the customer to qualify the customer for a rental transaction.

11. The method of claim 10 wherein the stored qualification information associated with the customer includes whether the customer has previously rented a vehicle.

12. The method of claim 10 wherein the stored qualification information associated with the customer includes whether the customer has previously purchased any other good or service.

13. The method of claim 10 wherein the stored qualification information associated with the customer includes the time of the rental.

14. The method of claim 10 wherein the stored qualification information associated with the customer includes the location of the rental.

15. The method of claim 10 wherein the stored qualification information associated with the customer includes previously uploaded images associated with the customer.

16. The method of claim 10 wherein the stored qualification information associated with the customer includes a location of the rental and geographic information on the customer's driver's license.

17. The method of claim 10 wherein the stored qualification information associated with the customer includes the results of the dexterity test.

18. A system for real-time qualification of rental customers, the system comprising:

a database operative to store account information associated with a customer for a rental transaction;

an input component operative to receive from a mobile device a first image file including an uploaded image of the customer's driver's license having a first image of the customer and an uploaded second image file including a second image of the customer and metadata associated with the second image of the customer; and a processor operative to:

extract information from the metadata associated with the second image of the customer, including information sufficient to determine a time and location associated with the second image of the customer;

store in the database the uploaded image from the customer's driver's license, the uploaded second image of the customer, the information associated with the uploaded second image of the customer to qualify the customer for a rental transaction; and cause the mobile device to display a dexterity test to be taken by the customer using the mobile device, cause the mobile device to capture response information for the dexterity test regarding response time and accuracy of the customer's response, receive from the mobile device the captured response information for the dexterity test, and automatically calculate a dexterity test result based on the captured response information for the dexterity test; and use the dexterity test result to qualify the customer for the rental transaction.

19. The system of claim 18 wherein the processor is operative to compare the uploaded first image of the customer to the uploaded second image of the customer.

20. The system of claim 18 wherein the processor is operative to qualify the customer for the rental transaction if second image of the customer is uploaded within a pre-defined time before the rental time period begins.

21. The system of claim 18 wherein the pre-defined time before the rental time period begins is one hour or less.

22. The system of claim 18 wherein the information associated with the second uploaded image of the customer includes a timestamp associated with the second uploaded image the customer.

23. The system of claim 18 wherein the information associated with the second uploaded image of customer includes a GPS location associated with the second uploaded image of the customer.

24. The system of claim 18 wherein the processor is operative to simultaneously display the uploaded image of customer's driver's license and the uploaded second image of the customer for comparison by an administrator.

* * * * *